(12) United States Patent
Guo

(10) Patent No.: US 12,251,635 B2
(45) Date of Patent: Mar. 18, 2025

(54) METHOD AND APPARATUS FOR CONTROLLING VIRTUAL CHARACTER, COMPUTER DEVICE, AND STORAGE MEDIUM

(71) Applicant: Tencent Technology (Shenzhen) Company Limited, Shenzhen (CN)

(72) Inventor: Chang Guo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 333 days.

(21) Appl. No.: 17/883,446

(22) Filed: Aug. 8, 2022

(65) Prior Publication Data
US 2023/0045852 A1    Feb. 16, 2023

Related U.S. Application Data

(63) Continuation of application No. PCT/CN2021/100092, filed on Jun. 15, 2021.

(30) Foreign Application Priority Data

Jul. 2, 2020 (CN) .......................... 202010624699.4

(51) Int. Cl.
*A63F 13/56* (2014.01)
*A63F 13/52* (2014.01)
(Continued)

(52) U.S. Cl.
CPC .............. *A63F 13/56* (2014.09); *A63F 13/52* (2014.09); *A63F 13/60* (2014.09); *G06T 13/40* (2013.01);
(Continued)

(58) Field of Classification Search
CPC .............................................. A63F 2300/6607
See application file for complete search history.

(56) References Cited

U.S. PATENT DOCUMENTS 9,177,409 B2 * 11/2015 Rennuit .................. G06T 13/40
11,052,317 B1 * 7/2021 Imamura ................. A63F 13/57
(Continued)

FOREIGN PATENT DOCUMENTS

| CN | 102509338 A | 6/2012 |
|---|---|---|
| CN | 106296778 A | 1/2017 |

(Continued)

OTHER PUBLICATIONS

Tencent Technology, WO, PCT/CN2021/100092, Sep. 13, 2021, 5 pgs.

(Continued)

*Primary Examiner* — Jay Trent Liddle
(74) *Attorney, Agent, or Firm* — Morgan, Lewis & Bockius LLP

(57) ABSTRACT

This application relates to a method for controlling a virtual character performed by a computer device, the method including: displaying at least a portion of a target virtual character in a virtual scene, the target virtual character being bound with basic bones and deformed bones; triggering the character action of the target virtual character in the virtual scene; when the character action comprises a character movement, controlling the target virtual character to implement the character movement in the virtual scene through a movement of a basic bone associated with the character movement; and when the character action comprises a local character deformation, controlling the target virtual character to implement the local character deformation in the virtual scene through a deformation of a deformed bone associated with the local character deformation.

20 Claims, 13 Drawing Sheets

(51) Int. Cl.
*A63F 13/60* (2014.01)
*G06T 13/40* (2011.01)
*G06T 17/20* (2006.01)
*A63F 13/833* (2014.01)

(52) U.S. Cl.
CPC ............ *G06T 17/20* (2013.01); *A63F 13/833* (2014.09); *A63F 2300/6607* (2013.01); *A63F 2300/8029* (2013.01)

(56) References Cited

U.S. PATENT DOCUMENTS

| | | | | |
|---|---|---|---|---|
| 2013/0093751 | A1* | 4/2013 | Stachniak | A63F 13/22 |
| | | | | 345/419 |
| 2013/0225293 | A1* | 8/2013 | Glassenberg | A63F 13/52 |
| | | | | 463/32 |
| 2021/0043000 | A1* | 2/2021 | Chen | G06T 19/20 |
| 2022/0028150 | A1* | 1/2022 | Soulvie | G06T 13/20 |
| 2022/0080318 | A1* | 3/2022 | Li | A63F 13/60 |

FOREIGN PATENT DOCUMENTS

| | | |
|---|---|---|
| CN | 107294838 A | 10/2017 |
| CN | 108961367 A | 12/2018 |
| CN | 110298907 A | 10/2019 |
| CN | 110992495 A | 4/2020 |
| CN | 111161427 A | 5/2020 |
| CN | 111659115 A | 9/2020 |
| EP | 0840256 A2 | 5/1998 |

OTHER PUBLICATIONS

Tencent Technology, IPRP, PCT/CN2021/100092, Dec. 13, 2022, 6 pgs.

Dapeng Chicken Wings, "How to Achieve Bone Zoom in and out in 3DSMax Without Affecting the Upper and Lower Bones", CGJOY, jan. 21, 2019, 6 pgs., Retrieved from the Internet: https://www.cgjoy.com/forum.php?mod=viewthread&tid=218119.

Dazhi_Unity Technologies, "Detailed Explanation of Unity Animation System 1: How to Make Animation in Unity?", Bilbili, May 17, 2020, 10 pgs., Retrieved from the Internet: https://www.bilibili.com/read/cv6098367/.

Goma Systems Corporation, International Search Report in PCT/US2007/005593, published under WO 2007/103312 A3, on Sep. 13, 2007, 3 pgs.

Oh Blue Orange, "Fragrance to me! IGN 9.5 points! Switch Fire Emblem Three Houses", Nice Video, 1 pg, Retrieved from the Internet: https://haokan.baidu.com/v?vid=13924937111571595105.

Tencent Technology, ISR, PCT/CN2021/100092, Sep. 13, 2021, 2 pgs.

* cited by examiner

METHOD AND APPARATUS FOR CONTROLLING VIRTUAL CHARACTER, COMPUTER DEVICE, AND STORAGE MEDIUM

CROSS-REFERENCE TO RELATED APPLICATIONS

This application is a continuation application of PCT Patent Application No. PCT/CN2021/100092, entitled "VIRTUAL CHARACTER CONTROL METHOD AND APPARATUS, COMPUTER DEVICE, AND STORAGE MEDIUM" filed on Jun. 15, 2021, which claims priority to Chinese Patent Application No. 202010624699.4, filed with the State Intellectual Property Office of the People's Republic of China on Jul. 2, 2020, and entitled "METHOD AND APPARATUS FOR CONTROLLING VIRTUAL CHARACTER, COMPUTER DEVICE, AND STORAGE MEDIUM", all of which are incorporated herein by reference in their entirety.

FIELD OF THE TECHNOLOGY

This application relates to the field of computer technologies, and in particular, to a method and an apparatus for controlling a virtual character, a computer device, and a computer storage medium.

BACKGROUND OF THE DISCLOSURE

During producing an animation for a character, some shots in the animation need to highlight special effects of the character. For example, when special deformations are required for a character, such as a hand stretching out or drawing back thus becoming bigger and a torso expansion, a conventional practice is to manually draw these parts of a model animation, so that the corresponding parts of the character are deformed. However, in a conventional method for controlling a virtual character, there is a problem of low efficiency in controlling the virtual character.

SUMMARY

Embodiments of this application provide a method and an apparatus for controlling a virtual character, a computer device, and a storage medium.

The method for controlling a virtual character is executed by a computer device, and includes:
displaying at least a portion of a target virtual character in a virtual scene, the target virtual character being bound with basic bones and deformed bones;
triggering a character action of the target virtual character in the virtual scene;
controlling, when the character action includes a character movement, the target virtual character to implement the character movement in the virtual scene through a movement of a basic bone associated with the character movement; and
controlling, when the character action includes a local character deformation, the target virtual character to implement the local character deformation in the virtual scene through a deformation of a deformed bone associated with the local character deformation.

The apparatus for controlling a virtual character includes:
a display module, configured to display at least a portion of a target virtual character in a virtual scene, the target virtual character being bound with a basic bone and a deformed bone;
an action triggering module, configured to trigger a character action of the target virtual character in the virtual scene; and
a control module, configured to control, when the character action includes a character movement, the target virtual character to implement the character movement in the virtual scene through a movement of a basic bone associated with the character movement; and
configured to control, when the character action includes a local character deformation, the target virtual character to implement the local character deformation in the virtual scene through a deformation of a deformed bone associated with the local character deformation.

The computer device includes a memory and one or more processors, the memory stores computer-readable instructions, and the computer-readable instructions, when executed by the processors, cause the one or more processors to perform the steps of the method for controlling a virtual character described above.

One or more non-transitory readable storage media store computer-readable instructions, and the computer-readable instructions, when executed by one or more processors, cause the one or more processors to perform the steps of the method for controlling a virtual character described above.

DESCRIPTION OF EMBODIMENTS

Figure 1:
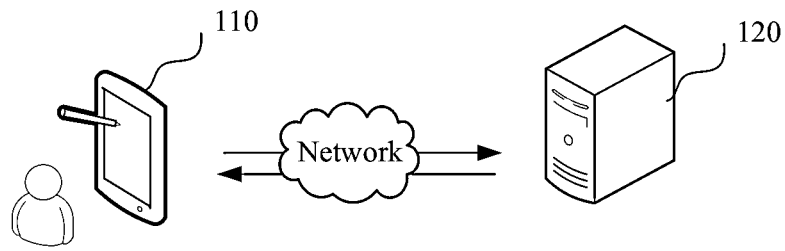
FIG. 1 is an application environment diagram of a method for controlling a virtual character according to an embodiment.

A method for controlling a virtual character provided in this application may be applied to an application environment as shown in FIG. 1. A terminal device 110 communicates with a server 120 through a network. The terminal device 110 may be, but is not limited to: a smartphone, a tablet computer, a notebook computer, a desktop computer, a smart TV, or the like. The terminal device 110 is provided with a client. The client may be, such as a video client, an instant messaging client, a browser client, an education client, or the like, configured to play a video and the like. The server 120 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. A quantity of terminal devices and servers are not limited in this application. The server 120 may be configured to send an action parameter value to the terminal device, and the action parameter value is used for enabling the terminal device 110 to control a target virtual character to complete a character action. The terminal device 110 is configured to display at least a portion of the target virtual character in a virtual scene, the target virtual character being bound with a basic bone and a deformed bone; trigger the character action of the target virtual character in the virtual scene; control, when the character action includes a character movement, the target virtual character to implement the character movement in the virtual scene through a movement of a basic bone associated with the character movement; and control, when the character action includes a local character deformation, the target virtual character to implement the local character deformation in the virtual scene through a deformation of a deformed bone associated with the local character deformation.

Figure 2:
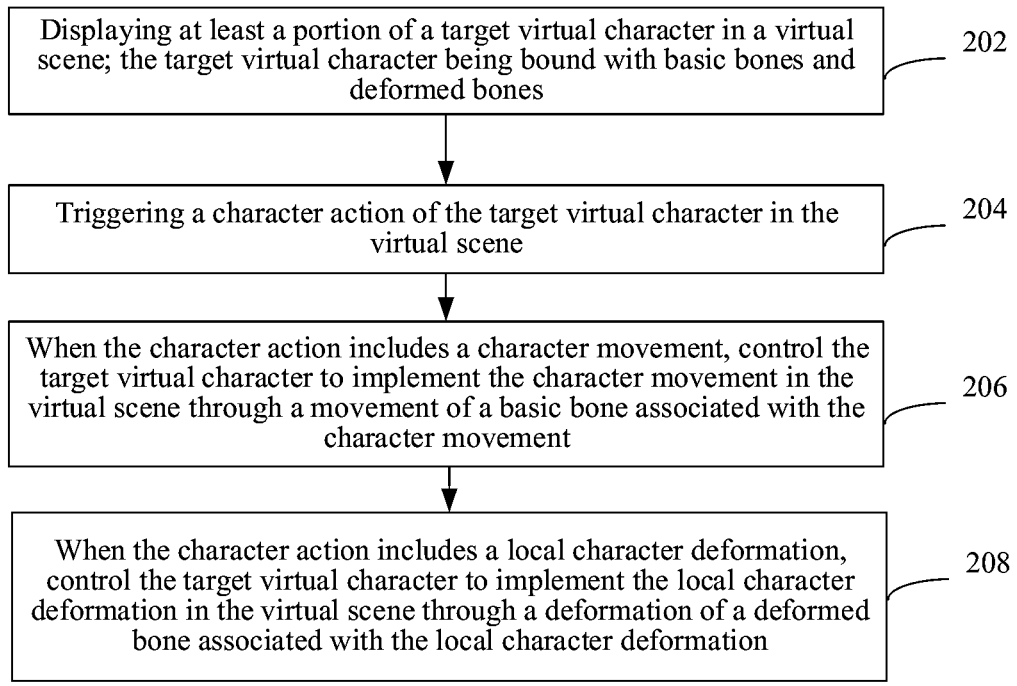
FIG. 2 is a schematic flowchart of a method for controlling a virtual character according to an embodiment.

In an embodiment, as shown in FIG. 2, a method for controlling a virtual character is provided. The method may be executed by a terminal device or a server, or may be executed jointly by the terminal device and the server. This method embodiment is described by taking an example in which the method is executed by a terminal device 110, and includes the following operations:

Operation 202: Displaying at least a portion of a target virtual character in a virtual scene, the target virtual character being bound with one or more basic bones and one or more deformed bones.

The virtual scene may be used for simulating a three-dimensional virtual space, and may also be used for simulating a two-dimensional virtual space. The virtual scene may include a sky, a land, an ocean, a building, a mountain forest, a target virtual character, and the like. This is not limited herein. The virtual scene may be displayed after opening an application, for example, being displayed after opening a game. The target virtual character is an active character in the virtual scene. The target virtual character may be used for representing a virtual image of a user in the virtual scene. The target virtual character may be specifically a target virtual human, a target virtual animal, or the like. This is not limited herein.

The basic bone is used for enabling the target virtual character to implement the character movement. The character movement includes actions such as moving forward, moving backward, turning, running, and the like. The basic bone may be specifically a character studio (CS) bone. The deformed bone is used for enabling the target virtual character to implement the character deformation. The character deformation may include magnification, reduction, lengthening or shortening, and the like. This is not limited herein. The deformed bone may be specifically a dummy bone. In this application, the basic bone and the deformed bone may be collectively referred to as a bone. Each bone has a unique corresponding bone identifier, used for distinguishing different bones.

Specifically, a terminal device displays at least a portion of a target virtual character in a virtual scene. The at least a portion of the target virtual character may be a head of the target virtual character, an avatar of the target virtual character, or a side view of the target virtual character, or the like. This is not limited herein.

Operation 204: Triggering a character action of the target virtual character in the virtual scene.

The character action is used for enabling the target virtual character to move in the virtual scene. The character action may be moving forward, moving backward, turning, running, magnification, reduction, lengthening or shortening, releasing a skill, or the like. This is not limited herein.

Specifically, when a character control operation for the target virtual character is detected, a character action of the target virtual character corresponding to the character control operation is triggered in the virtual scene. For example, a w inputted through a keyboard of the terminal device corresponds to moving forward, an s corresponds to moving backward, an a corresponds to moving to the left, and a d corresponds to moving to the right. Then, when a control operation of a key w on the target virtual character is detected, an action of moving forward of the target virtual character corresponding to the w is triggered in the virtual scene.

Operation 206: Controlling, when the character action includes a character movement, the target virtual character to implement the character movement in the virtual scene through a movement of a basic bone associated with the character movement.

Each basic bone has a unique corresponding basic bone identifier. The basic bone associated with the character movement associated with the character movement may be basic bones of four limbs of the character, or include only a basic bone of a leg, or the like. This is not limited herein.

Specifically, when a character action triggered in a virtual scene includes a character movement, a terminal device may determine, through a basic bone identifier associated with the character movement, a basic bone associated with the character movement. The terminal device controls, through a movement of the basic bone associated with the character movement, a target virtual character to implement the character movement in the virtual scene. An example in which the character movement is walking and the basic bone associated with the walking is basic bones of four limbs is used for description. Then, the terminal device controls, through the swing of the basic bones of the four limbs associated with the character movement, the target virtual character to implement the character walking in the virtual scene.

Operation 208: Controlling, when the character action includes a local character deformation, the target virtual character to implement the local character deformation in the virtual scene through a deformation of a deformed bone associated with the local character deformation.

Each deformed bone has a unique corresponding deformed bone identifier. The local character deformation may be a deformation of a portion of a body of a character, or may be a transformation of a weapon of the character, or the like. This is not limited herein. The deformed bone associated with the local character deformation may be set according to character needs. The deformed bone associated with the local character deformation may be set as needed, which may be specifically set according to a type of a virtual character, or the like. This is not limited herein. For example, a deformed bone associated with a type A of a virtual character is a deformed bone at a neck, a deformed bone associated with a type B of a virtual character is deformed bones at four limbs, and the like. This is not limited herein.

Specifically, when a character action triggered in a virtual scene includes a local character deformation, a terminal device may determine, through a deformed bone identifier associated with a character movement, a deformed bone associated with the character movement. The terminal device controls, through a deformation of a deformed bone associated with the local character deformation, the target virtual character to implement the local character deformation in the virtual scene. For example, the local character deformation is a magnification of a right arm, and a deformed bone associated with the magnification of a right arm is a deformed bone of the right arm. The terminal device controls, through a magnification of the deformed bone of the right arm associated with the magnification of a right arm, the target virtual character to implement the magnification of a right arm in the virtual scene.

In this embodiment, when a character action includes a character movement and a local character deformation, a terminal device controls, through a movement of a basic bone associated with the character movement, a target virtual character to implement the character movement in a virtual scene, and the terminal device controls, through a deformation of a deformed bone associated with the local character deformation, the target virtual character to implement the local character deformation in the virtual scene.

In this embodiment, there may be at least one type of local character deformation. For example, the local character deformation includes an X-portion deformation and a Y-portion deformation. The X-portion deformation may be triggered by an X key of a keyboard, and a deformed bone associated with the X-portion deformation is deformed bones of four limbs. The Y-portion deformation may be triggered by a Y key of the keyboard, and a deformed bone associated with the Y-portion deformation is a deformed bone of a head. Then, when the character action includes the X-portion deformation, through a deformation of the deformed bones of four limbs associated with the X-portion deformation, the target virtual character is controlled to implement the limb deformation of the character in the virtual scene. In a case that the character action includes the Y-portion deformation, through a deformation of the deformed bone of a head associated with the Y-portion deformation, the target virtual character is controlled to implement the head deformation of the character in the virtual scene.

In this embodiment, for example, when a character action of a target virtual character triggered in a game is releasing a skill, and when the skill includes a character movement, for example, the character movement is kicking, through a movement of a basic bone of a leg associated with the kicking, the target virtual character is controlled to perform a kicking action in the game. In a case that the skill further includes thickening a leg, that is, when the skill is kicking while thickening a leg, through a magnification of a deformed bone of the leg associated with the thickening a leg, the target virtual character is controlled to implement the leg deformation in the game. In the example described above, the game is the virtual scene, the releasing a skill is the character action, the kicking is the character movement, and the thickening a leg is the local character deformation.

In the method for controlling a virtual character described above, a target virtual character is bound with a basic bone and a deformed bone, when a character action triggered in a virtual scene includes a character movement, through a movement of the basic bone, the target virtual character is controlled to implement the character movement, and when the character action triggered in the virtual scene includes a local character deformation, the local character deformation is implemented through a deformation of the deformed bone. Therefore, compared to a method in a conventional technology in which an animation of the virtual character is manually drawn, the method can improve the control efficiency of the virtual character. In addition, because the target virtual character is controlled through the basic bone and the deformed bone, it is unnecessary to save so many images, and an occupied storage space can be reduced.

In an embodiment, the movement of the basic bone includes at least one of a bone movement or a bone rotation. The deformation of the deformed bone includes at least one of a local bone lengthening or shortening or an overall bone scaling.

Specifically, the bone movement means that a bone moves from one position in a virtual scene to another. The bone rotation means that the bone moves around an axis without changing a position thereof. The local bone lengthening or shortening refers to lengthening or shortening one end of a bone. The overall bone scaling refers to magnifying or reducing a bone as a whole. The movement of the basic bone may include only the bone movement, or only the bone rotation, or include both the bone movement and the bone rotation. The deformation of the deformed bone may include only the local bone lengthening or shortening, or only the overall bone scaling, or may include both the local bone lengthening or shortening and the overall bone scaling.

In the method for controlling a virtual character described above, a movement of a basic bone includes at least one of a bone movement or a bone rotation, and a deformation of a deformed bone includes at least one of a local bone lengthening or shortening or an overall bone scaling. That is, the basic bone and the deformed bone may separately implement different functions, so that a target virtual character can perform different character actions, and the interactivity of the virtual character is improved.

In an embodiment, a target virtual character is generated by a character construction operation. The character construction operation includes: creating a basic skeleton of the target virtual character, the basic skeleton including more than one basic bone; adding at least one deformed bone to the basic skeleton; and skinning the basic skeleton to which the deformed bone is added, to obtain the target virtual character.

The basic skeleton enables the virtual character to move in a virtual scene. The basic skeleton includes at least one basic bone. Through skinning, a skin may be added to the skeleton.

Specifically, a terminal device creates a virtual skeleton of a target virtual character, and a basic skeleton includes more than one basic bone. The terminal device adds at least one deformed bone to the basic skeleton. For example, the terminal device may add a deformed bone to four limbs of the basic skeleton. The terminal device performs skinning on the basic skeleton added with a deformed bone to obtain the target virtual character.

In this embodiment, after performing the skinning on the basic skeleton with the deformed bone, the terminal device then performs mapping to obtain the target virtual character.

In this embodiment, the terminal device may adjust the virtual skeleton of the target virtual character according to actual needs, for example, adjusting a length and a size of each bone in the virtual skeleton, or increasing or decreasing the basic bone, or the like.

In the method for controlling a virtual character described above, a basic skeleton of a target virtual character is created, at least one deformed bone is added to the basic skeleton, and the basic skeleton added with the deformed bone is skinned to obtain the target virtual character. Therefore, the target virtual character can be deformed by constructing the deformed bone, and an occupied storage space is reduced.

Figure 3:
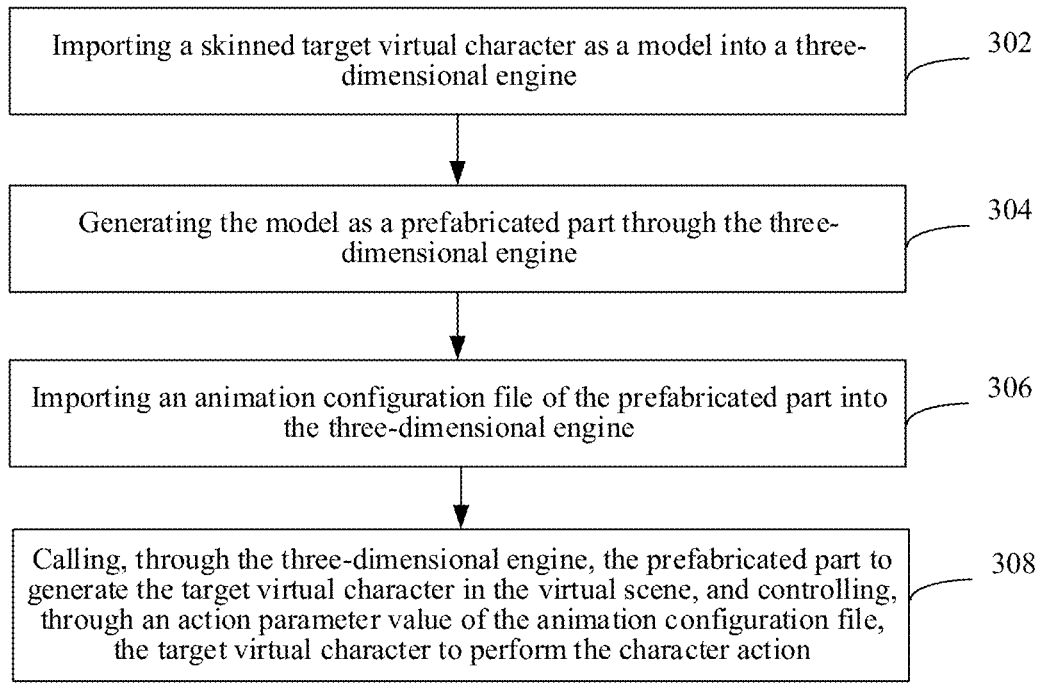
FIG. 3 is a schematic flowchart of generating a target virtual character in a virtual scene according to an embodiment.

In an embodiment, FIG. 3 is a schematic flowchart of generating a target virtual character in a virtual scene according to an embodiment. The method for controlling a virtual character further includes:

Operation 302: Importing a skinned target virtual character as a model into a three-dimensional engine.

The three-dimensional engine be used for developing stand-alone games for Windows, MacOS, and Linux platforms, video games for game host platforms such as PlayStation, XBox, Wii, 3DS, and Nintendo Switch, or games for mobile devices such as an iOS, an Android, and the like. Game platforms supported by the Unity also include HTML5 web platforms based on the WebGL technology, and new-generation multimedia platforms such as tvOS, Oculus Rift, ARKit, and the like. In addition to being used for developing video games, the Unity is a comprehensive authoring tool that is widely used for interaction contents such as architectural visualization, real-time three-dimensional animation, and the like.

Specifically, a terminal device imports a skinned target virtual character as a model into a three-dimensional engine. The target virtual character may then be displayed in the three-dimensional engine.

Operation 304: Generating the model as a prefabricated part through the three-dimensional engine.

The prefabricated part may specifically refer to a prefab, which may be considered as a component template for a batch application, for example, a model that needs to be reused in a virtual scene, such as an enemy, a soldier, a weapon, a bullet, or any wall that uses the same bricks. The prefab is like a clone, but a generated position and angle or some attributes are different, which is similar to a class in c++.

Specifically, a terminal device generates a model as a prefabricated part through a three-dimensional engine.

Operation 306: Importing an animation configuration file of the prefabricated part into the three-dimensional engine.

The animation configuration file may include an animation parameter used for controlling a basic bone and a deformed bone, or may include a process in which the target virtual character performs a character action.

Specifically, a terminal device imports an animation configuration file of a prefabricated part into a three-dimensional engine.

Operation 308: Calling, through the three-dimensional engine, the prefabricated part to generate the target virtual character in the virtual scene, and controlling, through an action parameter value of the animation configuration file, the target virtual character to perform a character action.

The action parameter value is used for representing at least one of a movement parameter value of the basic bone, a rotation parameter value of the basic bone, a lengthening or shortening parameter value of the deformed bone, or a scaling parameter value of the deformed bone in the target virtual character. The action parameter value may be sent by a server to the terminal device or may be stored by the terminal device. The terminal device implements a movement of an associated bone through the action parameter value, and controls the target virtual character to perform the character action. The associated bone may be at least one of the basic bone or the deformed bone.

Specifically, through a three-dimensional engine, a prefabricated part, for example, a prefab, is called to generate a target virtual character in a virtual scene, a configuration is based on a parameter value of an imported animation configuration file, and through the parameter value of the animation configuration file, the target virtual character is controlled to perform a character action. For example, a terminal device generates an animation configuration file through a 3DS max software, imports the animation configuration file of a prefabricated part into a three-dimensional engine, may parse an action parameter value of each bone in the animation configuration file through the three-dimensional engine, and may then control a basic bone and a deformed bone based on the action parameter value to enable a target virtual character to perform a character action.

In the method for controlling a virtual character described above, a skinned target virtual character is imported as a model into a three-dimensional engine, a prefabricated part is generated through the three-dimensional engine, an animation configuration file is imported, the prefabricated part is called to generate a target virtual character in a virtual scene, and through an action parameter value of the animation configuration file, the target virtual character is controlled to perform a character action. Therefore, through the action parameter value, the target virtual character can be controlled to be deformed, it is unnecessary to save so many images, and an occupied storage space is reduced.

Figure 4:
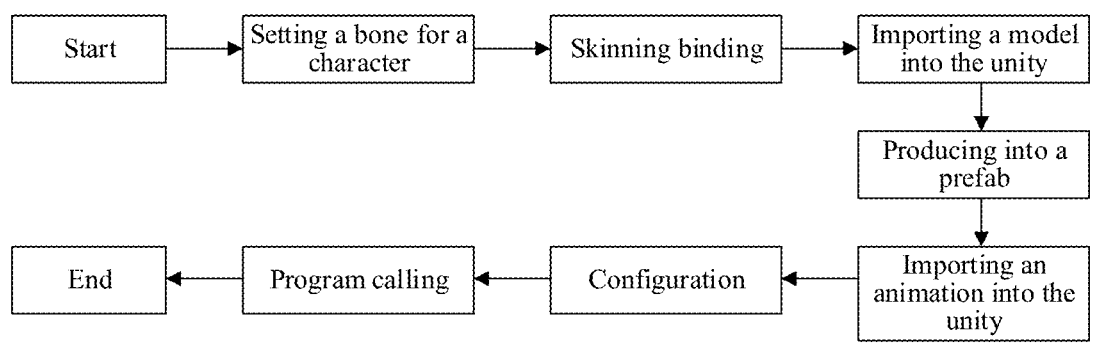
FIG. 4 is a schematic flowchart of a method for controlling a virtual character according to another embodiment.

In an embodiment, FIG. 4 is a schematic flowchart of a method for controlling a virtual character according to another embodiment. After starting, a 3DS max software is entered. 3DS max, also referred to as 3D Studio Max, 3ds Max, or 3ds MAX, is a three-dimensional animation rendering and production software based on a personal computer (PC) system. Operations on a constructed character skeleton include: creating a basic skeleton of a target virtual character, the basic skeleton including more than one basic bone, and adding at least one deformed bone to the basic skeleton. Skinning binding includes: skinning binding the basic skeleton to which a deformed bone is added, to obtain the target virtual character. Importing a model into the unity includes: importing a skinned target virtual character as a model into the unity. The unity is a three-dimensional engine. Producing into a prefab includes: generating the model as the prefab through the three-dimensional engine. That is, the prefab includes constructed bones, the skinning binding, and the model. The prefab is a prefabricated part. Importing an animation into the unity refers to importing an animation configuration file of the prefabricated part into the unity. The artistic effects and animation effects of the target virtual character may be displayed through parsing the animation configuration file. Configuration refers to configuring the prefab and animation configuration file together in the unity. Program calling refers to calling the prefabricated part to generate the target virtual character in the virtual scene, and controlling, through an action parameter value of the animation configuration file, the target virtual character to perform a character action.

In an embodiment, the adding at least one deformed bone to the basic skeleton includes: determining a target basic bone in the basic skeleton; determining a quantity of deformed bones according to a length of the target basic bone; and adding the quantity of sequentially connected deformed bones at a position of the target basic bone on the basic skeleton.

A corresponding position of the target basic bone is a corresponding position of the to-be-added deformed bone. A quantity of target basic bones is not limited. In addition, the target basic bone is at least one basic bone preset in the basic bone.

Specifically, a terminal device determines a target basic bone in a basic skeleton. The target basic bone may be a preset basic bone, for example, basic bones at four limbs. Alternatively, the terminal device may determine the target basic bone in the basic skeleton according to a type of the virtual character. For example, when the virtual character is a virtual human, then the target basic bone may be an arm; and when the virtual character is a virtual monster, then the target basic bone may be a leg.

The terminal device determines the quantity of deformed bones according to a length of the target basic bone. The quantity of sequentially connected deformed bones are added at a position of the target basic bone on the basic skeleton. For example, the target virtual character is a virtual human, the target basic bone may be an arm bone, and there are four target basic bones. Then, according to a length of the target basic bone, two deformed bones may be constructed on each target basic bone. Because the deformed bone is in a cube shape, when only one deformed bone is constructed on the target basic bone, an arm of the virtual character may be big. Therefore, a quantity of deformed bones needs to be adjusted based on a design size of the arm of the target virtual character.

In the method for controlling a virtual character described above, a quantity of deformed bones is determined according to a length of a target basic bone, and the quantity of sequentially connected deformed bones are connected at a position of a target basic bone on a basic skeleton. Therefore, the quantity of deformed bones is more matched with the virtual character, and the fidelity of the obtained target virtual character can be improved.

In an embodiment, the method for controlling a virtual character further includes: displaying a thumbnail object of the target virtual character on a character movement map; controlling the thumbnail object to move within a movement range of the thumbnail object; and switch to a character interaction virtual scene when a movement of the thumbnail object satisfies a character interaction trigger condition The character movement map is used for displaying a range of actions that the target virtual character can take on an electronic map. The virtual scene may be a role-playing game (RPG), a strategy role-playing game (SRPC), or the like. This is not limited herein. The thumbnail object is a reduced image of the target virtual character. The thumbnail object may be used for performing a character action on the character movement map. The character interaction virtual scene refers to a virtual scene including at least two virtual characters, one of which is the target virtual character, and the target virtual character may interact with another virtual character in the virtual scene.

Specifically, a terminal device displays a thumbnail object of a target virtual character on a character movement map. In a case that a movement operation on the thumbnail object is detected, the terminal device controls the thumbnail object to move within a movement range of the thumbnail object. In a case that a movement of the thumbnail object satisfies an interaction trigger condition, the terminal device switches to the character interaction virtual scene. The interaction trigger condition is a situation in which, for example, the target virtual character meets another virtual character in another camp, or the target virtual character falls within an attack range of another virtual character in another camp, or the target virtual character meets a non-player character (NPC) of a battle, or a skill releasing operation or an almighty playing operation is triggered in the terminal device. Then, the terminal device displays at least a portion of the target virtual character in the virtual scene of the character interaction, the target virtual character being bound with a basic bone and a deformed bone, triggers a character action of the target virtual character in the virtual scene, and controls, when the character action includes a character movement, the target virtual character to implement the character movement in the virtual scene of the character interaction through a movement of a basic bone associated with the character movement; and controls, when the character action includes a local character deformation, the target virtual character to implement the local character deformation in the virtual scene through a deformation of a deformed bone associated with the local character deformation.

Figure 5:
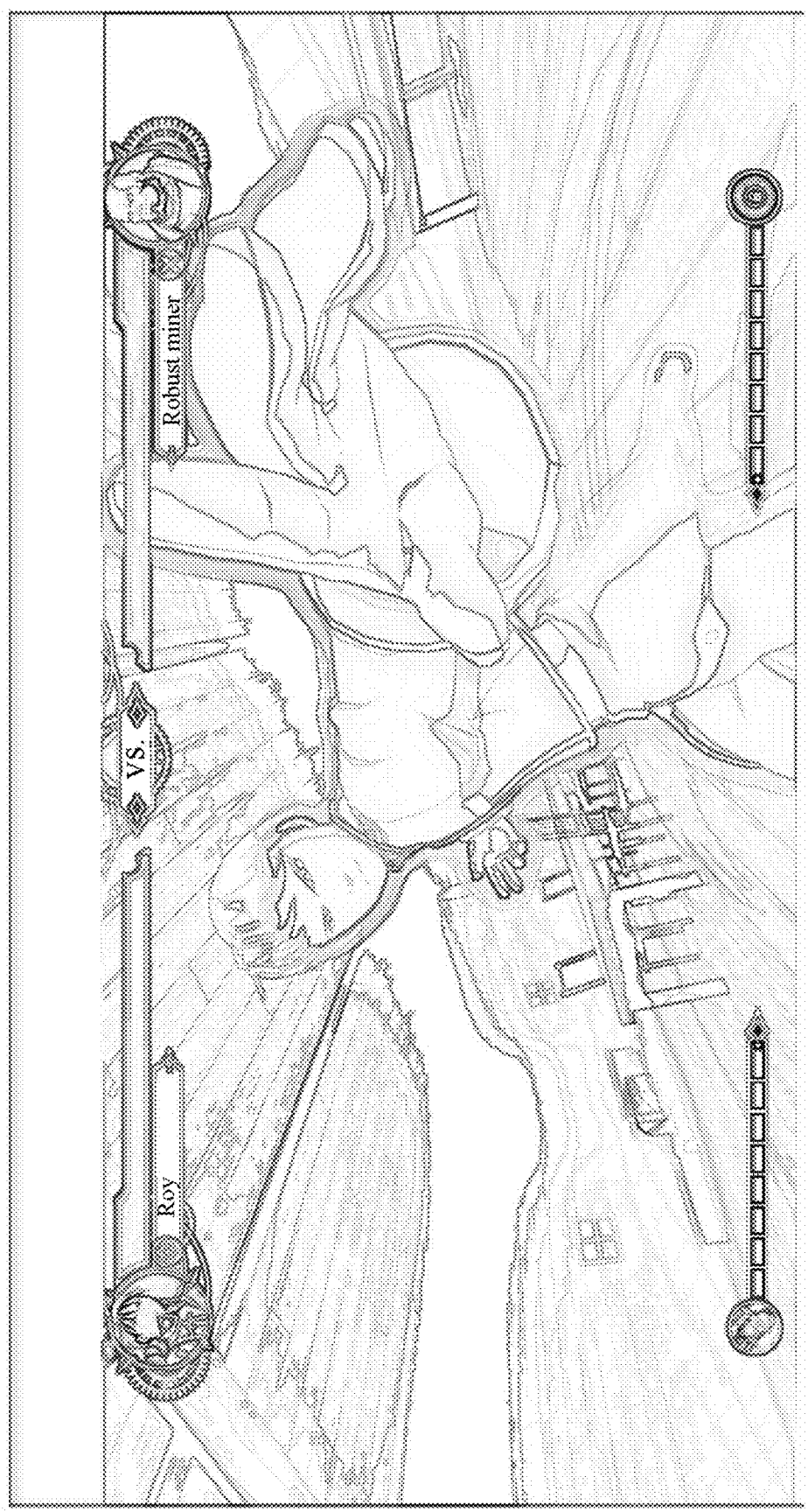
FIG. 5 is a schematic diagram of an interface of a virtual scene of a character interaction according to an embodiment.
Figure 6:
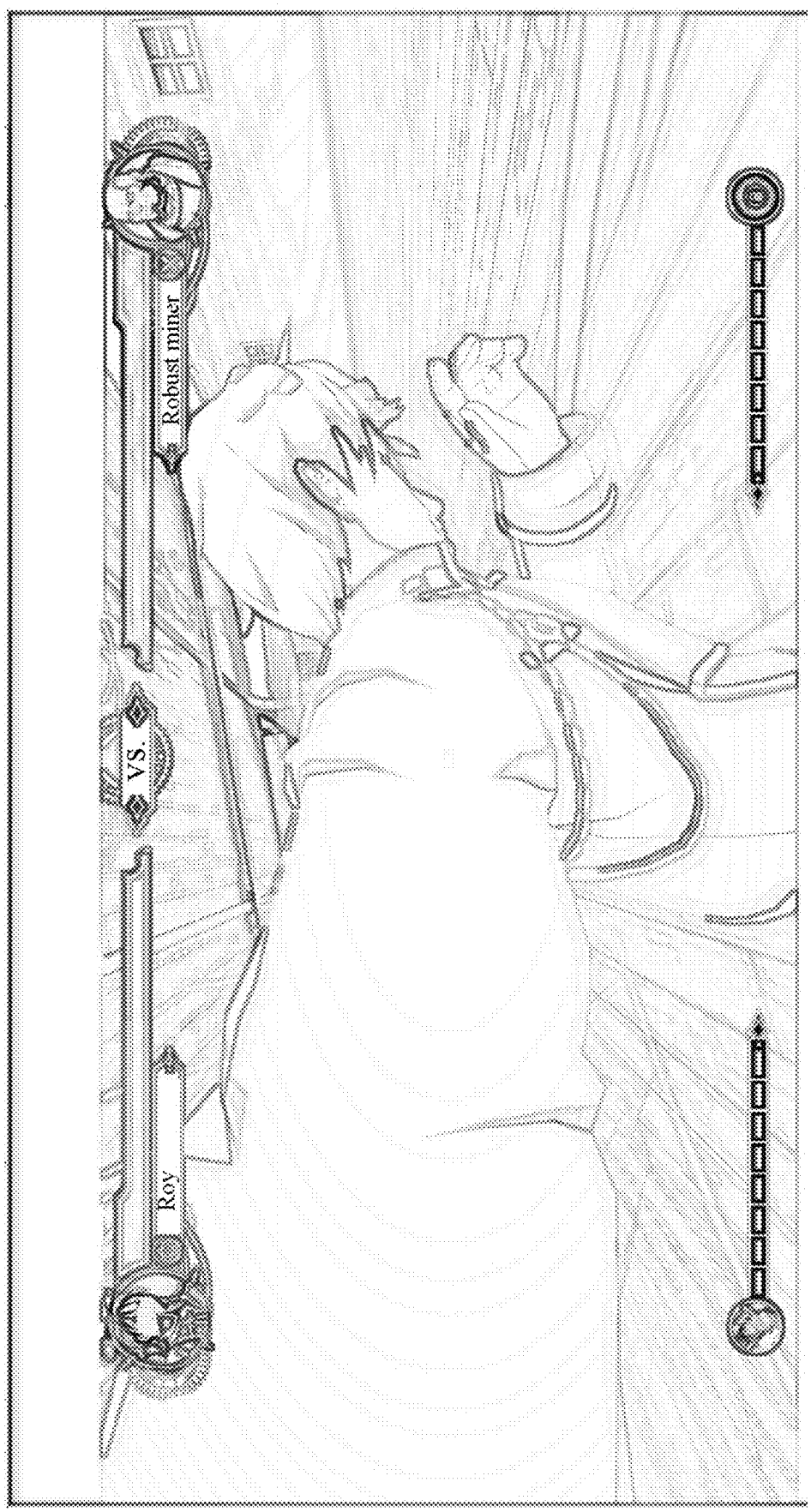
FIG. 6 is a schematic diagram of an interface of a virtual scene of a character interaction according to another embodiment.

For example, in a tabletop wargame, a thumbnail object of Roy is displayed on a map of the tabletop wargame, and the thumbnail object is controlled to move within a movement range of a displayed square. In a case that the thumbnail object of Roy moves to a position of a robust miner, a skill needs to be released or an almighty needs to be played. At this time, the character needs to exaggeratedly deform a body thereof, then it is necessary to switch to a virtual scene of a character interaction as shown in FIG. 5. FIG. 5 is a schematic diagram of an interface of a virtual scene of a character interaction according to an embodiment. FIG. 6 is a schematic diagram of an interface of a virtual scene of a character interaction according to another embodiment. A portion of legs, a head, a body, and hands of Roy are displayed in the virtual scene of FIG. 5. In addition, when a character action triggered in the tabletop wargame includes magnifying a hand, through a magnification of a bone associated with the magnifying a hand, for example, a magnification of a bone at a palm of the hand, Roy is controlled to implement the hand magnification during the interaction of the tabletop wargame. A portion of a right arm, a portion of a left arm, a left hand, an upper body, and a left palm of Roy are displayed in a virtual scene of FIG. 6. In addition, when the character action triggered in the tabletop wargame includes thickening an arm, through a magnification of a bone associated with the thickening an arm, for example, a magnification of a bone on the arm, Roy is controlled to implement the arm thickening during the interaction of the tabletop wargame. In the example described above, the tabletop wargame is the virtual scene, Roy is the target virtual character, that the thumbnail object of Roy moves to the position of the robust miner is the character interaction trigger condition, the movement range of the displayed square is the movement range of the thumbnail object, the local character deformation is the magnifying a hand and the thickening an arm, and the virtual scene is the tabletop wargame.

In the method for controlling a virtual character described above, a thumbnail object is controlled to move within a corresponding movement range, and when a movement of the thumbnail object satisfies a character interaction trigger condition, a character interaction scene is switched to. Therefore, the interactivity in a virtual scene can be enhanced.

Figure 7:
FIG. 7 is a schematic diagram of a deformed hand of a virtual character according to an embodiment.

In an embodiment, FIG. 7 is a schematic diagram of a deformed hand of a virtual character according to an embodiment. It can be seen from the figure that the hand of the target virtual character is magnified, and a magnification effect is greater than that in a method of the field of view. In FIG. 7, for the hand, a local magnification effect of the virtual object is also implemented by controlling the magnification of the deformed bone.

In an embodiment, the method for controlling a virtual character further includes: loading a prefabricated part in a virtual scene through a three-dimensional engine, the prefabricated part being obtained by constructing a deformed bone on a basic skeleton of a target virtual character and then performing skinning; and creating an instance through the prefabricated part to obtain the target virtual character.

The prefabricated part is obtained by constructing the deformed bone on the basic skeleton of the target virtual character and then performing the skinning. Specifically, in a virtual scene, a terminal device loads a prefabricated part through a three-dimensional engine, and creates an instance through the prefabricated part to obtain a target virtual character.

In the method for controlling a virtual character described above, through a three-dimensional engine, a prefabricated part is loaded, an instance is created through the prefabricated part, and a target virtual character is obtained. Therefore, the fidelity of the target virtual character can be improved and the user experience is improved.

In an embodiment, the virtual scene is an animation editing scene. The method for controlling a virtual character further includes: in a virtual scene, when a target virtual character performs a character action, recording a key frame in which the target virtual character performs the character action; and generating a video animation based on the key frame.

The animation editing scene may refer to a scene corresponding to an animation creation. An action of the target virtual character at a time point of the frame is recorded in the key frame. For example, a hand swing and a leg deformation of the target virtual character are recorded in the key frame. This is not limited herein. Key frames may be evenly or unevenly distributed. The evenly distributed may be that, for example, a 1st frame, a 10th frame, a 20th frame . . . , and a 100th frame are the key frames. The unevenly distributed may be that, for example, a 1st frame, a 15th frame, a 20th frame . . . , a 100th frame are the key frames.

Specifically, in an animation editing scene, when a target virtual character performs a character action, a terminal device records a key frame during the performing of the target virtual character, and the key frame includes an action posture of the target virtual character. The terminal device may automatically generate a video animation of successive frames based on the key frames. For example, a target virtual character implements a character movement, then a key frame of the character movement is recorded; the target virtual object implements a local character deformation, then a key frame of the local character deformation is recorded; and the target virtual object implements the character movement and the local character deformation, then key frames including the character movement and the local character deformation are recorded.

In the method for controlling a virtual character described above, in an animation editing scene, when a target virtual character performs a character action, a key frame during the performing of the target virtual character is recorded, and a video animation is generated based on the key frame. Therefore, the video animation of the target virtual character during performing the character action can be produced and obtained, the video animation of the virtual character is easy to be modified, and the control efficiency of the virtual character is improved.

In an embodiment, the method for controlling a virtual character further includes: displaying a thumbnail object of the target virtual character on a character movement map; controlling the thumbnail object to move within a movement range of the thumbnail object; switching to a character interaction scene when a movement of the thumbnail object satisfies a character interaction trigger condition; and playing the video animation when the character action of the target virtual character is triggered in the character interaction scene.

The character interaction scene includes at least two virtual characters, one of which is the target virtual character, and the target virtual character may interact with another virtual character in the character interaction scene.

Specifically, a terminal device displays a character movement map and displays a thumbnail object of a target virtual character on the character movement map. In a case that a movement operation on the thumbnail object is detected, the terminal device controls the thumbnail object to move within a movement range of the thumbnail object. In a case that a movement of the thumbnail object satisfies the interaction trigger condition, the terminal device switches to a character interaction scene. The interaction trigger condition is a situation in which, for example, the target virtual character meets another virtual character in another camp, or the target virtual character falls within an attack range of another virtual character in another camp, or the target virtual character meets an NPC of a battle. This is not limited herein. In a case that the character action of the target virtual character is triggered in the character interaction scene, the terminal device plays the video animation.

For example, in a tabletop wargame, a thumbnail object of Roy is displayed on a map of the tabletop wargame, and the thumbnail object is controlled to move within a movement range of a displayed square. In a case that the thumbnail object of Roy moves to a position of a robust miner, a skill releasing scene needs to be switched to. In a case that a character action of the target virtual character is triggered in the skill releasing scene, a video animation generated in an animation editing scene is played. In the example described above, the tabletop wargame is the virtual scene, the movement range of the displayed square is the movement ranged of the thumbnail object, and the skill releasing scene is the character interaction scene.

In the method for controlling a virtual character described above, a thumbnail object is controlled to move within a corresponding movement range, when a movement of the thumbnail object satisfies a character interaction trigger condition, a character interaction scene is switched to, and when a character action of a target virtual character is triggered in the character interaction scene, a video animation is played. Therefore, a deformation effect can be implemented by the virtual character through a deformed bone, and the fidelity of the virtual character is improved.

In an embodiment, a method for controlling a virtual character includes the following operations:

Operation (a1): Creating a basic skeleton of a target virtual character, the basic skeleton including more than one basic bone.

Operation (a2): Determining a target basic bone in the basic skeleton.

Operation (a3): Determining a quantity of deformed bones according to a length of the target basic bone.

Operation (a4): Adding the quantity of sequentially connected deformed bones at a position of the target basic bone on the basic skeleton.

Operation (a5): Skinning the basic skeleton to which the deformed bone is added, to obtain the target virtual character.

Operation (a6): Importing the skinned target virtual character as a model into a three-dimensional engine.

Operation (a7): Generating the model as a prefabricated part through the three-dimensional engine.

Operation (a8): Importing an animation configuration file of the prefabricated part into the three-dimensional engine.

Operation (a9): Calling, through the three-dimensional engine, the prefabricated part to generate the target virtual character in a virtual scene, and controlling, through an action parameter value of the animation configuration file, the target virtual character to perform a character action.

Operation (a10): Displaying a thumbnail object of the target virtual character on a character movement map.

Operation (a11): Controlling the thumbnail object to move within a movement range of the thumbnail object.

Operation (a12): Switching to a character interaction virtual scene when a movement of the thumbnail object satisfies a character interaction trigger condition.

Operation (a13): Loading the prefabricated part in the virtual scene through the three-dimensional engine, the prefabricated part being obtained by constructing a deformed bone on the basic skeleton of the target virtual character and then performing skinning.

Operation (a14): Creating an instance through the prefabricated part to obtain the target virtual character.

Operation (a15): Displaying at least a portion of the target virtual character in the virtual scene, the target virtual character being bound with a basic bone and a deformed bone.

Operation (a16): Triggering the character action of the target virtual character in the virtual scene.

Operation (a17): Controlling, when the character action includes a character movement, the target virtual character to implement the character movement in the virtual scene through a movement of a basic bone associated with the character movement.

Operation (a18): Controlling, when the character action includes a local character deformation, the target virtual character to implement the local character deformation in the virtual scene through a deformation of a deformed bone associated with the local character deformation.

In the method for controlling a virtual character described above, a basic skeleton of a target virtual character is created, and a quantity of deformed bones is determined based on a target basic skeleton. Therefore, the quantity of deformed bones can be more matched with the virtual character, and the fidelity of the target virtual character can be improved. A target virtual character is generated by calling a prefabricated part through a three-dimensional engine, and through an action parameter value, the target virtual character is controlled to perform a character action. Therefore, compared to a method in a conventional technology in which an animation of the virtual character is manually drawn, the method can improve the control efficiency of the virtual character. In addition, because the target virtual character is controlled through a basic bone and a deformed bone, it is unnecessary to save so many images, and an occupied storage space can be reduced.

In an embodiment, a method for controlling a virtual character includes the following operations:

Operation (b1): Displaying at least a portion of a target virtual character in an animation editing scene, the target virtual character being bound with a basic bone and a deformed bone.

Operation (b2): Triggering a character action of the target virtual character in the animation editing scene.

Operation (b3): Controlling, when the character action includes a character movement, the target virtual character to implement the character movement in the animation editing scene through a movement of a basic bone associated with the character movement.

Operation (b4): Controlling, when the character action includes a local character deformation, the target virtual character to implement the local character deformation in the animation editing scene through a deformation of a deformed bone associated with the local character deformation.

Operation (b5): In the animation editing scene, when the target virtual character performs the character action, recording a key frame in which the target virtual character performs the character action.

Operation (b6): Generating a video animation based on the key frame.

Operation (b7): Displaying a thumbnail object of the target virtual character on a character movement map.

Operation (b9): Controlling the thumbnail object to move within a movement range of the thumbnail object.

Operation (b10): Switching to a character interaction scene when a movement of the thumbnail object satisfies a character interaction trigger condition.

Operation (b11): Playing a video animation when the character action of the target virtual character is triggered in the character interaction scene.

In the method for controlling a virtual character described above, in an animation editing scene, when a target virtual character performs a character action, a key frame during the performing of the target virtual character is recorded, and a video animation is generated based on the key frame. Therefore, the video animation of the target virtual character during performing the character action can be produced and obtained, the video animation of the virtual character is easy to be modified, and the control efficiency of the virtual character is improved. A thumbnail object is controlled to move within a corresponding movement range, when a movement of the thumbnail object satisfies a character interaction trigger condition, a character interaction scene is switched to, and when the character action of the target virtual character is triggered in the character interaction scene, a video animation is played. Therefore, a deformation effect can be implemented by the virtual character through a deformed bone, and the fidelity of the virtual character is improved.

Figure 8:
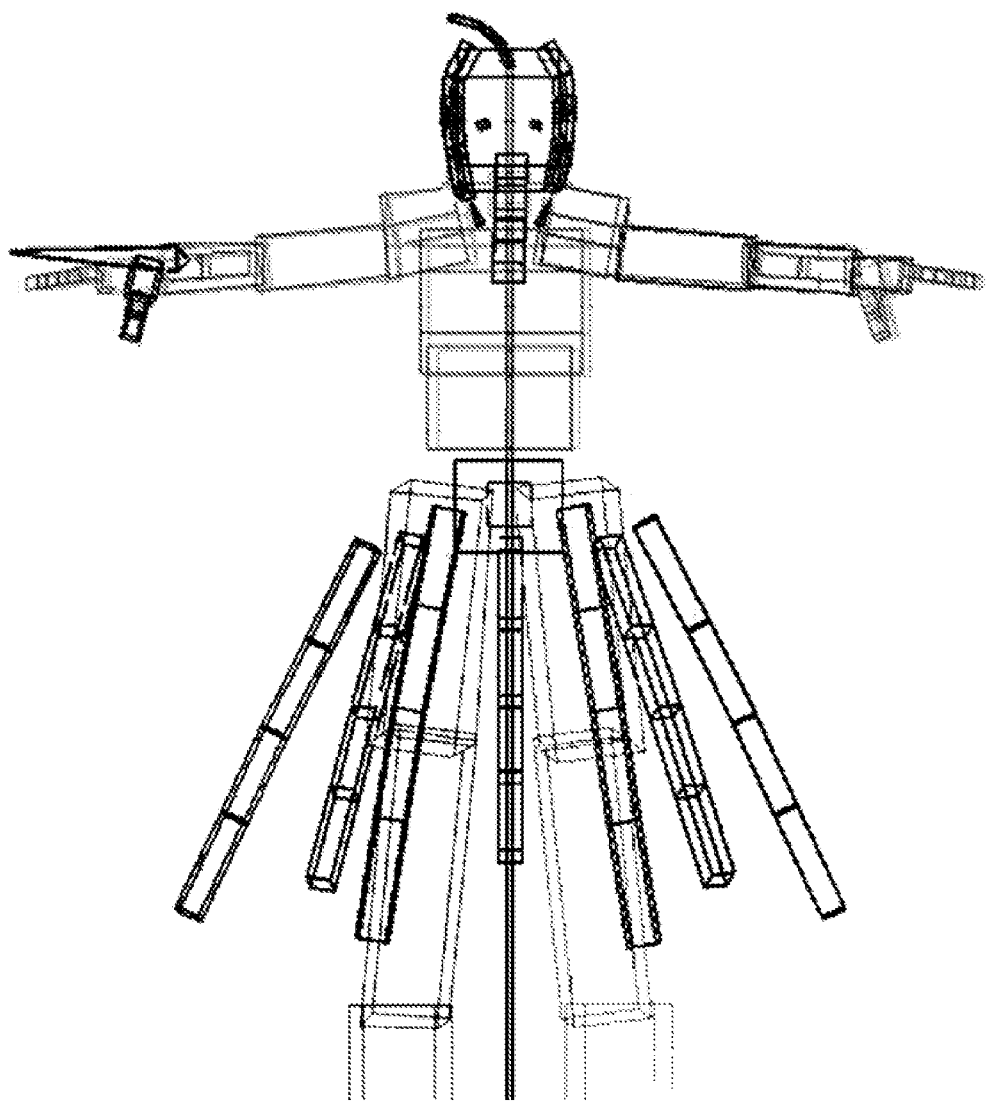
FIG. 8 is a schematic diagram of a basic skeleton corresponding to a target virtual character according to an embodiment.
Figure 9:
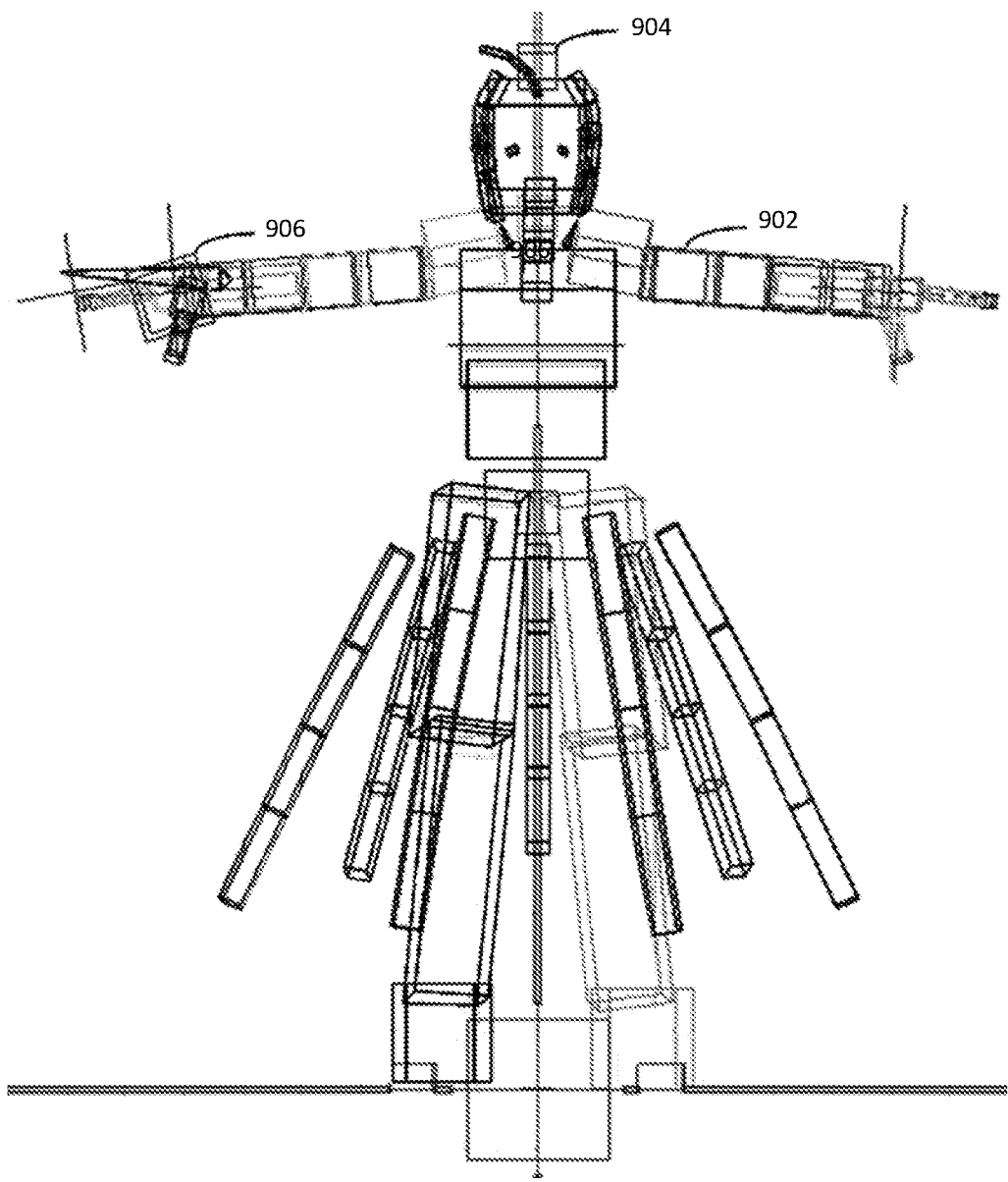
FIG. 9 is a schematic diagram of a basic skeleton with deformed bones being added according to an embodiment.

In an embodiment, 3DS max: 3D Studio Max, usually referred to as 3d Max or 3ds Max, is a three-dimensional animation rendering and production software developed by Discreet (later merged by Autodesk) based on a PC system. A former version is a 3D Studio family software based on a DOS operating system. FIG. 8 is a schematic diagram of a basic skeleton corresponding to a target virtual character according to an embodiment. FIG. 9 is a schematic diagram of a basic skeleton with deformed bones being added according to an embodiment. A block 902 in the figure is a deformed bone 902. In FIG. 9, a left arm of the target virtual character includes 4 deformed bones 902, and a right arm also includes 4 deformed bones 902. A block 904 on a head of the target virtual character is a special effect hanging point 904, and is used for displaying a bubble box and the like at a corresponding position. In FIG. 9, a weapon hanging point 906 is also included, which may be used for hanging a weapon at a corresponding position of the weapon hanging point 906.

Figure 10:
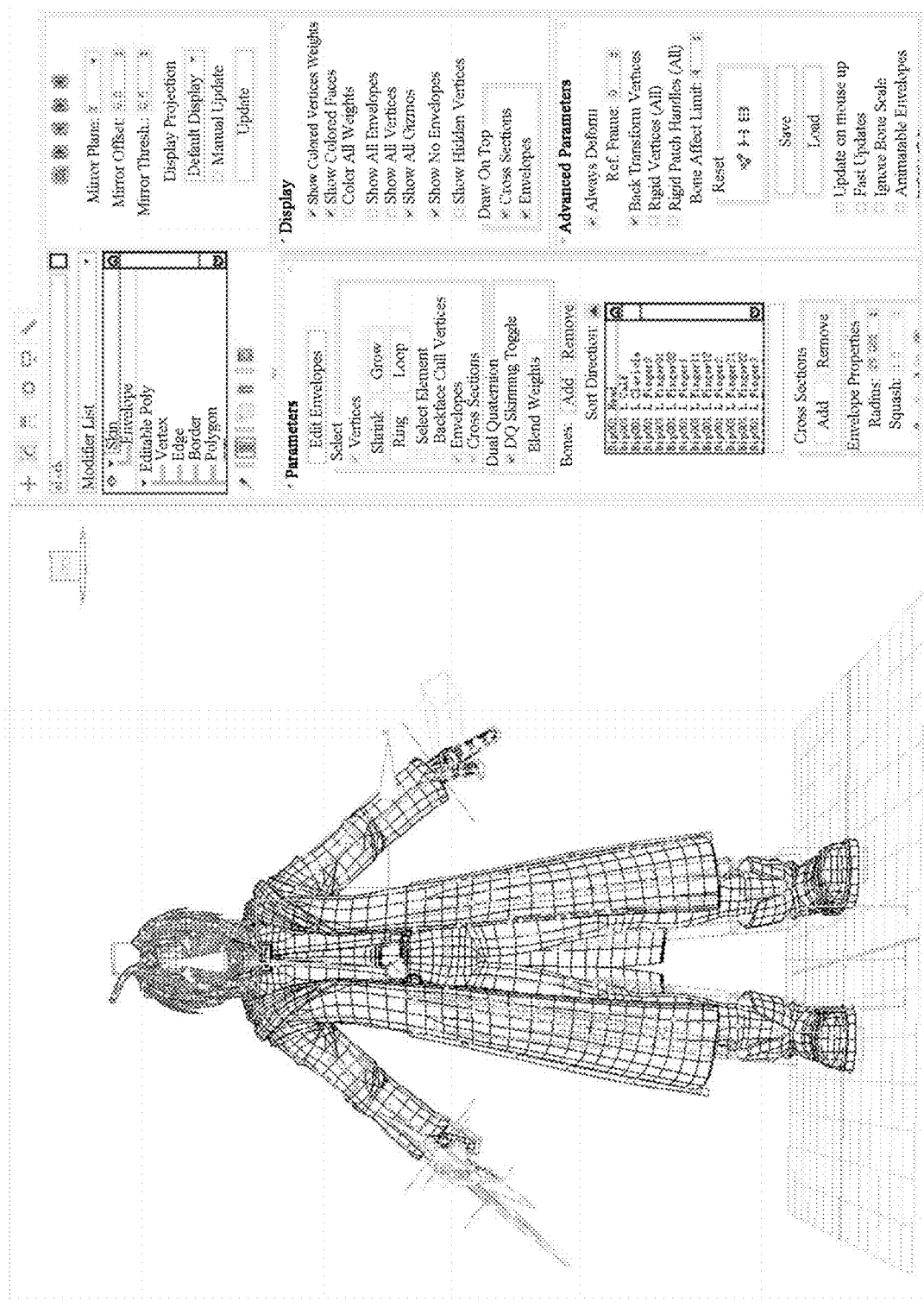
FIG. 10 is a schematic diagram of a skinned target virtual character according to an embodiment.

FIG. 10 is a schematic diagram of a skinned target virtual character according to an embodiment. A mesh in FIG. 10 is a skin of the target virtual character. The target virtual object in FIG. 10 has a weapon on a right hand thereof. Through skinning, the target virtual character may be made more realistic. The skinning may be selected in the 3DS max software and a DQ skinning toggle is selected in a dual quaternion in a parameters tab. A bone may be added or removed in the software, and each bone has a corresponding bone identifier. In addition, envelope properties and the like may be set in the software. Moreover, a display content may be selected, for example, checking options: Show Colored Vertices Weights, Show Colored Faces, Show All Gizmos, and Show No Envelopes in FIG. 10, options: Draw On Top Cross Sections and Envelopes may also be checked, and advanced parameters may also be set. The advanced parameters may be, for example, Always Deform, Back Transform Vertices, or the like.

Figure 11:
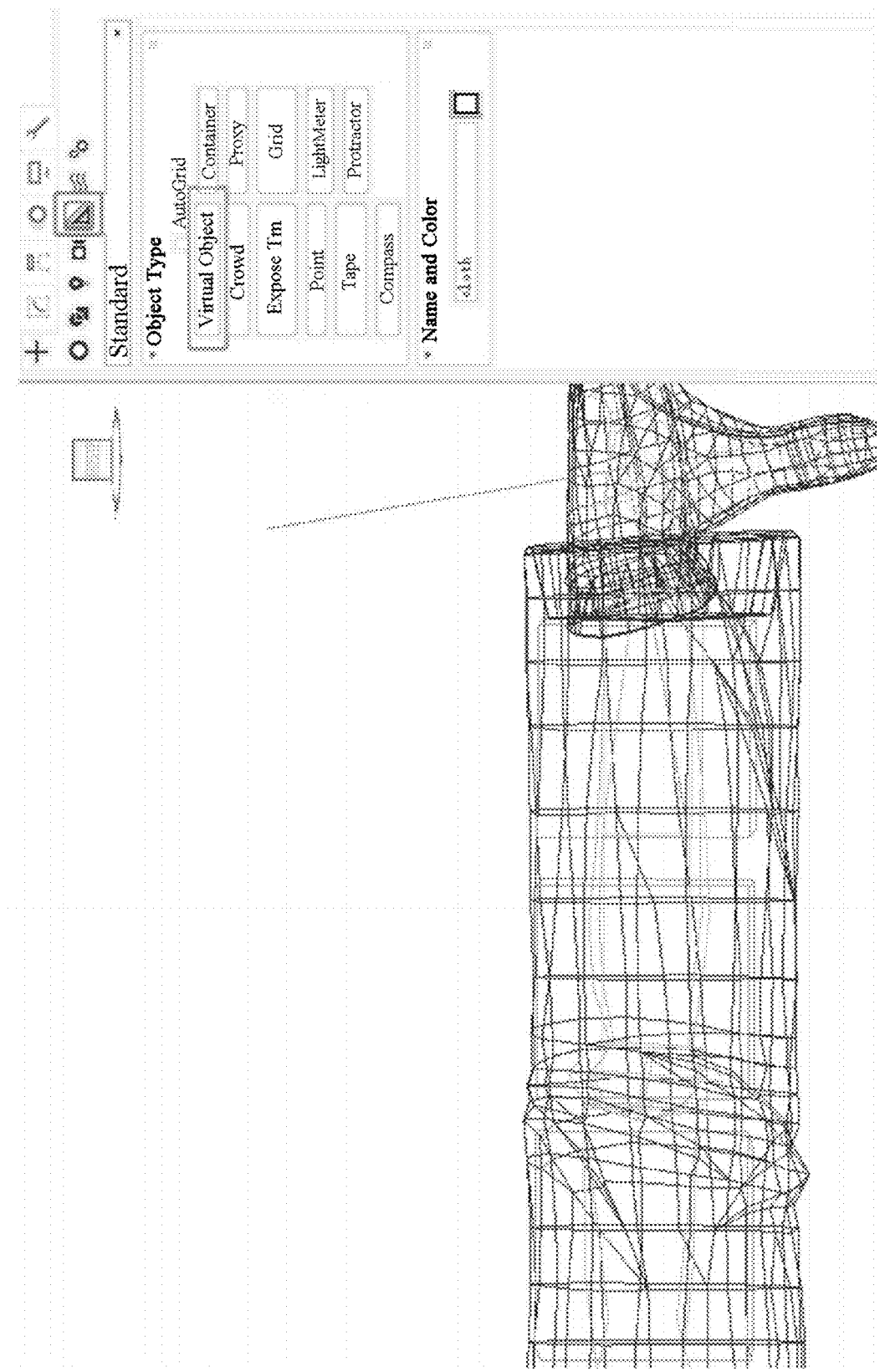
FIG. 11 is a schematic diagram of an interface of a position of a deformed bone according to an embodiment.

FIG. 11 is a schematic diagram of an interface of a position of a deformed bone according to an embodiment. In the max software, a creation point of a deformed bone is found, then a "virtual object" (dummy) is selected to drag the deformed bone out, and a size of the deformed bone is adjusted to match with the virtual character. The deformed bone is configured at a position corresponding to a basic bone and is configured according to a muscle line of the virtual character.

Figure 12:
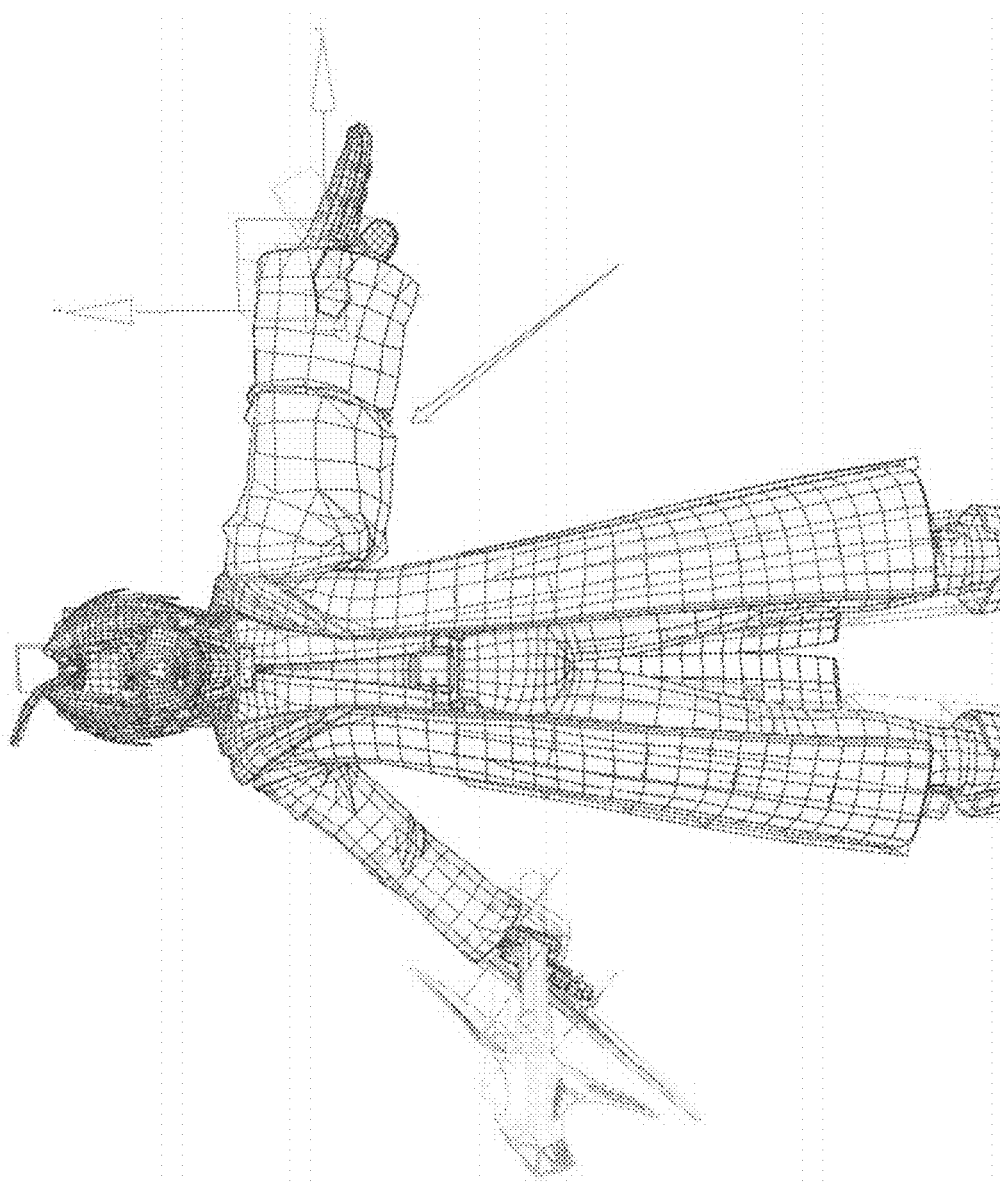
FIG. 12 is a schematic diagram of controlling a deformation of a deformed bone according to an embodiment.
Figure 13:
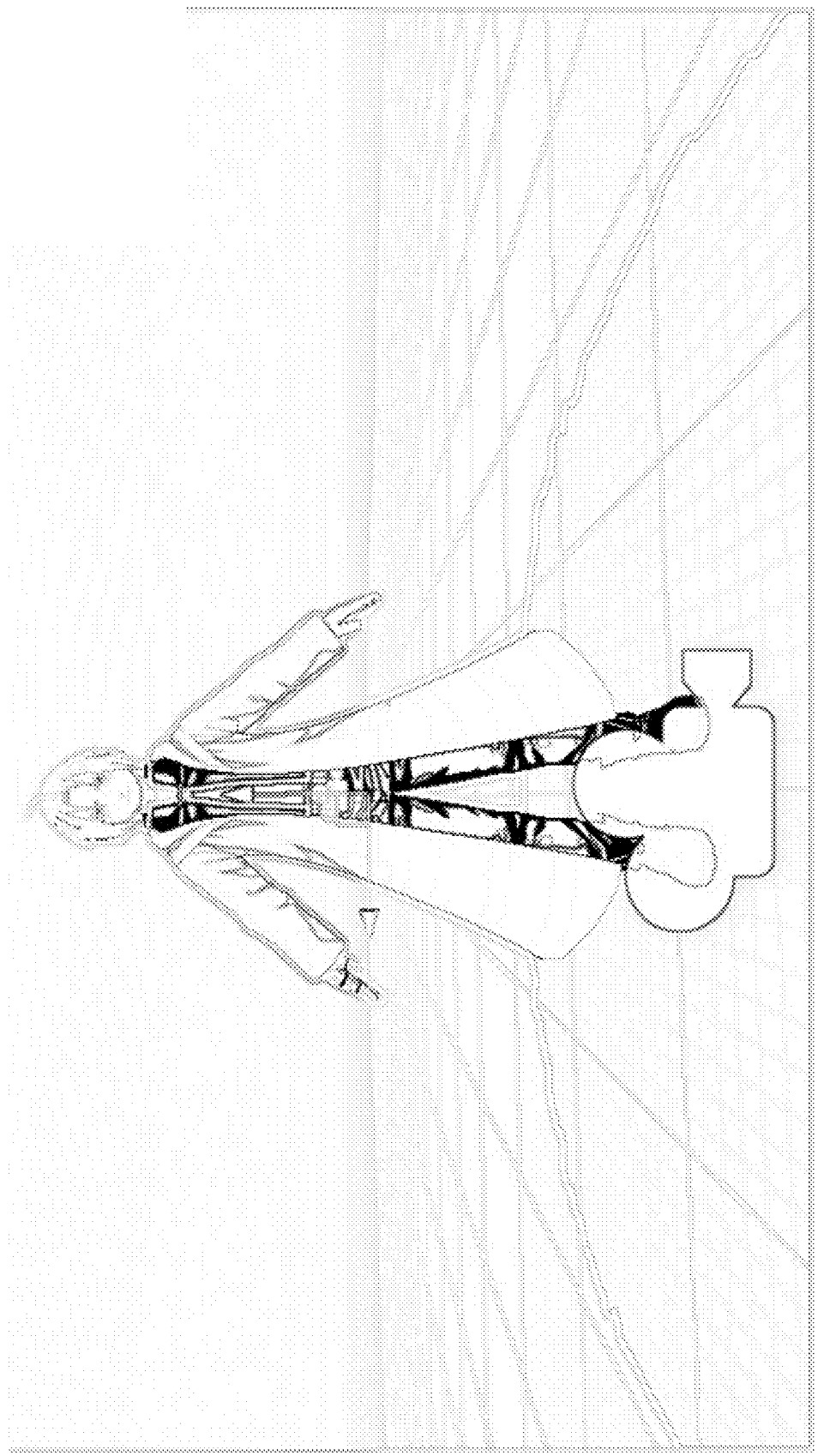
FIG. 13 is a schematic diagram of a target virtual character displayed in a three-dimensional engine according to an embodiment.
Figure 14:
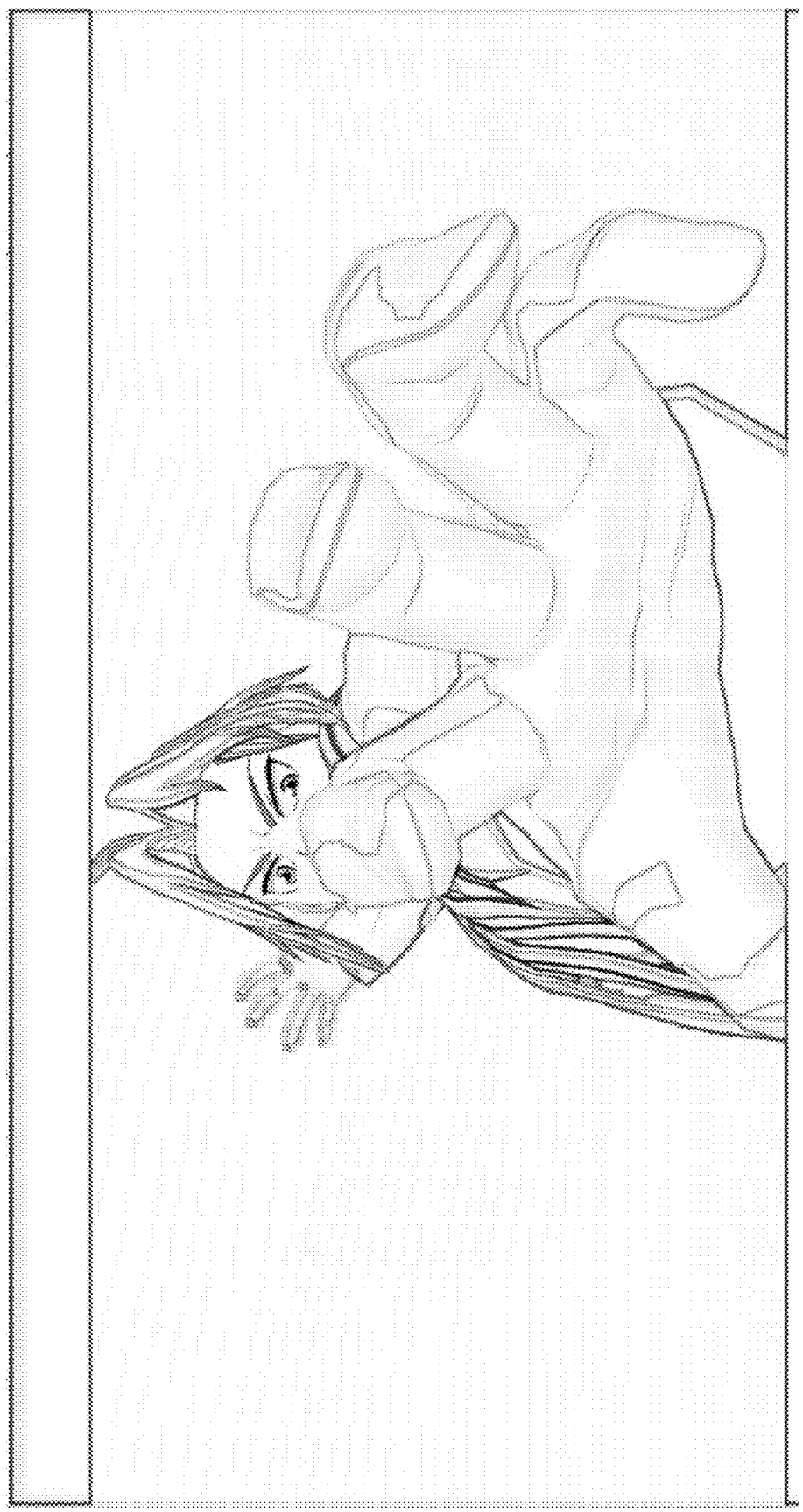
FIG. 14 is a schematic diagram of a magnified hand of a target virtual character according to an embodiment.

FIG. 12 is a schematic diagram of controlling a deformation of a deformed bone according to an embodiment. After skinning binding is finished, the deformed bone may be magnified or reduced in the 3DS MAX software, and it can be visually shown that a left arm of the target virtual character is getting bigger. FIG. 13 is a schematic diagram of a target virtual character displayed in a three-dimensional engine according to an embodiment. FIG. 14 is a schematic diagram of a magnified hand of a target virtual character according to an embodiment. In FIG. 14, a palm portion of the target virtual character is bound with a deformed bone, and through controlling the deformed bone to be magnified, a magnification effect of a hand of the target virtual character is displayed.

In this application, an application scenario applied to a tabletop wargame is also provided, and the application scenario applies the method for controlling a virtual character described above. Specifically, the application of the method for controlling a virtual character to the application scenario is as follows: in a project of the tabletop wargame, there are a lot of characters fighting, and in a battle of these characters, sometimes close-ups such as playing an almighty, releasing a skill, releasing an ultimate skill, and the like are needed. In some special battles, an expression method of an art animation needs to be more exaggerated and potent, which requires adding a local magnification or deformation function to an arm, a finger, a torso, a foot, and the like on the basis of a conventional animation expression. A CS skeleton is created for a target virtual character, and the CS skeleton includes more than one CS bone. A target CS bone is determined in the CS skeleton. A quantity of deformed bones is determined according to a length of the target CS bone. The quantity of sequentially connected deformed dummy bones are added at a position of the target CS bone on the CS skeleton. The CS skeleton added with the dummy bones is skinned to obtain the target virtual character. A skinned target virtual character is imported as a model into the unity. The model is generated as a prefab through the unity. An animation configuration file of the prefab is imported into the unity. Through the unity, the prefab is called to generate the target virtual character in the virtual scene, and through an action parameter value of the animation configuration file, the target virtual character is controlled to perform a character action. A thumbnail avatar of the target virtual character is displayed on a character movement map of the tabletop wargame. The thumbnail avatar is the thumbnail object. The thumbnail avatar is controlled to move within a corresponding activity range. In a case that a movement of the thumbnail object satisfies a character interaction trigger condition, that is, a skill needs to be released, or an almighty needs to be played, or the like, a confrontation scene is switched to. At least a portion of the target virtual character is displayed in the tabletop wargame. The target virtual character is bound with a CS bone and a dummy bone. For example, the character action is releasing a skill, and the virtual scene of the character interaction is a confrontation scene, a skill of the target virtual character is triggered in the virtual confrontation scene. In a case that the skill includes a character movement, for example, walking and jumping, through a movement of a CS bone associated with the character movement, the target virtual character is controlled to implement the character movement in a scene of the tabletop wargame. In a case that the skill includes a local character deformation, for example, a hand magnification, through a deformation of a dummy bone associated with the local character deformation, the target virtual character is controlled to implement the local character deformation in the scene of the tabletop wargame. The virtual scene is the tabletop wargame, the CS skeleton is the basic skeleton, the CS bone is the basic bone, the target CS bone is the target basic bone, the dummy bone is the deformed bone, the unity is the three-dimensional engine, the prefab is the prefabricated part, the thumbnail avatar is the thumbnail object, and the character interaction scene is the confrontation scene.

In this application, an application scenario in which an animation is edited is also provided, and the application scenario applies the method for controlling a virtual character described above. During producing an animation for a character, some shots in a game need to highlight special effects of the character, such as a hand stretching out or drawing back thus becoming bigger, and a torso expansion. In a case that a portion of the character needs to be specially deformed, at least the portion of the target virtual character is displayed in an animation editing scene. The target virtual character is bound with a CS bone and a dummy bone. The character action of the target virtual character is triggered in the virtual scene. In a case that the character action includes a character movement, through a movement of a CS bone associated with the character movement, the target virtual character is controlled to implement the character movement in the animation editing scene. In a case that the character action includes a local character deformation, through a deformation of a dummy bone associated with the local character deformation, the target virtual character is controlled to implement the local character deformation in the animation editing scene. In the animation editing scene, when the target virtual character performs the character action, a key frame in which the target virtual character performs the character action is recorded. A video animation is generated based on the key frame. A thumbnail object of the target virtual character is displayed on a character movement map in the virtual scene. The thumbnail object is controlled to move within a movement range of the thumbnail object. In a case that a movement of the thumbnail object satisfies a character interaction trigger condition, a confrontation scene is switched to. In a case that the character action of the target virtual character is triggered, a video animation generated based on the target virtual character performing the character action is played. The virtual scene is the animation editing scene, the CS skeleton is the basic skeleton, the CS bone is the basic bone, the target CS bone is the target basic bone, the dummy bone is the deformed bone, and the confrontation scene is the character interaction scene.

It is to be understood that although each operation of the flowcharts in FIG. 2 to FIG. 4 is shown sequentially according to arrows, the operations are not necessarily performed according to a sequence indicated by arrows. Unless explicitly specified in this specification, execution of the operations is not strictly limited in the sequence, and the operations may be performed in other sequences. In addition, at least some operations in FIG. 2 to FIG. 4 may include a plurality of operations or a plurality of stages, and these operations or stages are not necessarily performed at a same time instant, and may be performed at different time instants. The operations or stages are not necessarily performed in sequence, and the operations or stages may be performed alternately with at least some of other operations, or operations or stages of other operations.

Figure 15:
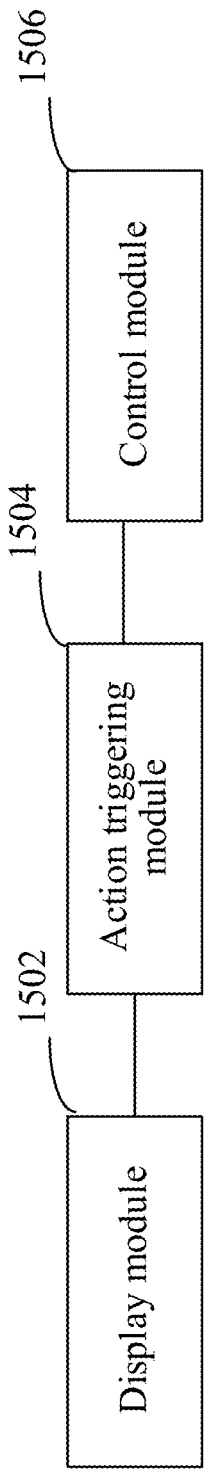
FIG. 15 is a structural block diagram of an apparatus for controlling a virtual character according to an embodiment.

In an embodiment, as shown in FIG. 15, an apparatus for controlling a virtual character is provided. The apparatus may become a part of a computer device by adopting a software module, or a hardware module, or a combination thereof. The apparatus specifically includes a display module 1502, an action triggering module 1504, and a control module 1506.

The display module 1502 is configured to display at least a portion of a target virtual character in a virtual scene. The target virtual character is bound with a basic bone and a deformed bone.

The action triggering module 1504 is configured to trigger a character action of the target virtual character in the virtual scene.

A first control module 1506 is configured to control, when the character action includes a character movement, the target virtual character to implement the character movement in the virtual scene through a movement of a basic bone associated with the character movement.

A second control module 1506 is configured to control, when the character action includes a local character deformation, the target virtual character to implement the local character deformation in the virtual scene through a deformation of a deformed bone associated with the local character deformation.

In the apparatus for controlling a virtual character described above, a target virtual character is bound with a basic bone and a deformed bone, when a character action triggered in a virtual scene includes a character movement, through a movement of the basic bone, the target virtual character is controlled to implement the character movement, and when the character action triggered in the virtual scene includes a local character deformation, the local character deformation is implemented through a deformation of the deformed bone. Therefore, compared to a method in a conventional technology in which an animation of the virtual character is manually drawn, the apparatus can improve the control efficiency of the virtual character. In addition, because the target virtual character is controlled through the basic bone and the deformed bone, it is unnecessary to save so many images, and an occupied storage space can be reduced.

In an embodiment, the movement of the basic bone includes at least one of a bone movement or a bone rotation. The deformation of the deformed bone includes at least one of a local bone lengthening or shortening or an overall bone scaling.

In the apparatus for controlling a virtual character described above, a movement of a basic bone includes at least one of a bone movement or a bone rotation, and a deformation of a deformed bone includes at least one of a local bone lengthening or shortening or an overall bone scaling. That is, the basic bone and the deformed bone may separately implement different functions, so that a target virtual character can perform different character actions, and the interactivity of the virtual character is improved.

In an embodiment, the apparatus for controlling a virtual character further includes a character construction module. The character construction module is configured to create a basic skeleton of the target virtual character, the basic skeleton including more than one basic bone; add at least one deformed bone to the basic skeleton; and skin the basic skeleton to which the deformed bone is added, to obtain the target virtual character.

In the apparatus for controlling a virtual character described above, a basic skeleton of a target virtual character is created, at least one deformed bone is added to the basic skeleton, and the basic skeleton added with the deformed bone is skinned to obtain the target virtual character. Therefore, the target virtual character can be deformed by constructing the deformed bone, and an occupied storage space is reduced.

In an embodiment, the character construction module is further configured to import a skinned target virtual character as a model into a three-dimensional engine; generate the model as a prefabricated part through the three-dimensional engine; import an animation configuration file of the prefabricated part into the three-dimensional engine; and call, through the three-dimensional engine, the prefabricated part to generate the target virtual character in a virtual scene. The control module 1506 is configured to control, through an action parameter value of the animation configuration file, the target virtual character to perform a character action.

In the apparatus for controlling a virtual character described above, a skinned target virtual character is imported as a model into a three-dimensional engine, a prefabricated part is generated through the three-dimensional engine, an animation configuration file is imported, the prefabricated part is called to generate a target virtual character in a virtual scene, and through an action parameter value of the animation configuration file, the target virtual character is controlled to perform a character action. Therefore, through the action parameter value, the target virtual character can be controlled to be deformed, it is unnecessary to save so many images, and an occupied storage space is reduced.

In an embodiment, the character construction module is further configured to determine a target basic bone in the basic skeleton; determine a quantity of deformed bones according to a length of the target basic bone; and add the quantity of sequentially connected deformed bones at a position of the target basic bone on the basic skeleton.

In the apparatus for controlling a virtual character described above, a quantity of deformed bones is determined according to a length of a target basic bone, and the quantity of sequentially connected deformed bones are connected at a position of a target basic bone on a basic skeleton. Therefore, the quantity of deformed bones is more matched with the virtual character, and the fidelity of the obtained target virtual character can be improved.

In an embodiment, the character construction module is further configured to load a prefabricated part in a virtual scene through a three-dimensional engine, the prefabricated part being obtained by constructing a deformed bone on a basic skeleton of a target virtual character and then performing skinning; and create an instance through the prefabricated part to obtain the target virtual character.

In the apparatus for controlling a virtual character described above, a thumbnail object is controlled to move within a corresponding movement range, and when a movement of the thumbnail object satisfies a character interaction trigger condition, a character interaction scene is switched to. Therefore, the interactivity in a virtual scene can be enhanced.

In an embodiment, the apparatus for controlling a virtual object further includes an animation generation module, configured to, in a virtual scene, when a target virtual character performs a character action, record a key frame in which the target virtual character performs the character action; and generate a video animation based on the key frame.

In the apparatus for controlling a virtual character described above, in a virtual scene, when a target virtual character performs a character action, a key frame during the performing of the target virtual character is recorded, and a video animation is generated based on the key frame. Therefore, the video animation of the target virtual character during performing the character action can be produced and obtained, the video animation of the virtual character is easy to be modified, and the control efficiency of the virtual character is improved.

In an embodiment, the control module 1506 is further configured to display a thumbnail object of a target virtual character on a character movement map; control the thumbnail object to move within a movement range of the thumbnail object; switch to a character interaction scene when a movement of the thumbnail object satisfies a character interaction trigger condition; and play the video animation when the character action of the target virtual character is triggered in the character interaction scene.

In the apparatus for controlling a virtual character described above, a thumbnail object is controlled to move within a corresponding movement range, when a movement of the thumbnail object satisfies a character interaction trigger condition, a character interaction scene is switched to, and when a character action of a target virtual character is triggered in the character interaction scene, a video animation is played. Therefore, a deformation effect can be implemented by the virtual character through a deformed bone, and the fidelity of the virtual character is improved.

For specific limitations on the apparatus for controlling a virtual character, reference may be made to the limitations on the method for controlling a virtual character described above. Details are not described herein again. The various modules in the apparatus for controlling a virtual character described above may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

Figure 16:
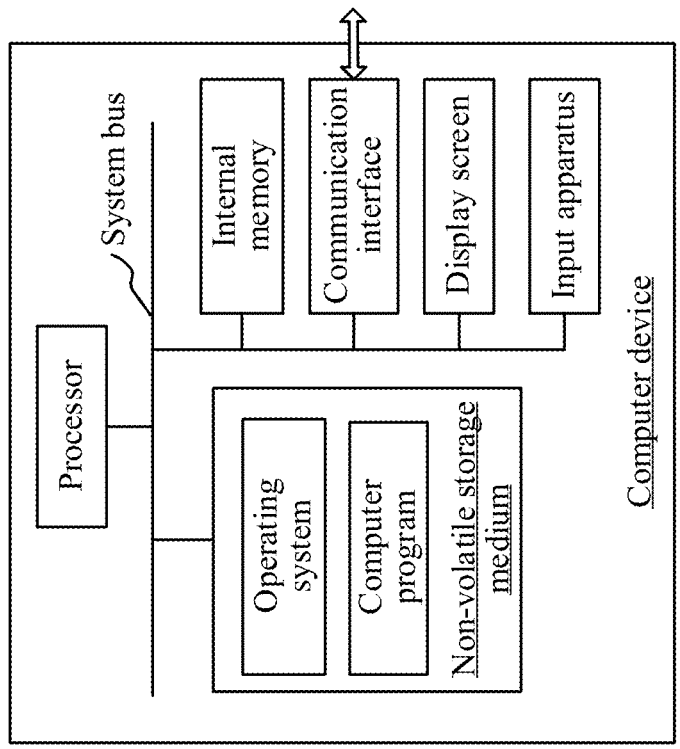
FIG. 16 is a diagram of an internal structure of a computer device according to an embodiment.

In an embodiment, a computer device is provided. The computer device may be a terminal device, and a diagram of an internal structure thereof may be as shown in FIG. 16. The computer device includes a processor, a memory, a communication interface, a display screen, and an input apparatus that are connected by using a system bus. The processor of the computer device is configured to provide computing and control capabilities. The memory of the computer device includes a non-transitory storage medium and an internal memory. The non-transitory storage medium stores an operating system and a computer program. The internal memory provides an environment for running of the operating system and the computer program in the non-transitory storage medium. The communication interface of the computer device is used for a wired or wireless communication with an external terminal device, and the wireless communication may be implemented by using a technology, such as WIFI, a carrier network, near field communication (NFC), or the like. The computer program, when executed by the processor, implements a method for controlling a virtual character. The display screen of the computer device may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

A person skilled in the art may understand that the structure shown in FIG. 16 is only a block diagram of a partial structure related to the solution of this application, and does not limit the computer device to which the solution of this application is applied. Specifically, the computer device may include more or fewer components than those shown in the figure, or some components may be combined, or a different component deployment is used.

In an embodiment, a computer device is also provided and includes a memory and one or more processors, the memory stores computer-readable instructions, and the computer-readable instructions, when executed by the processors, cause the one or more processors to perform the operations in various method embodiments described above.

In an embodiment, one or more non-transitory readable storage media storing computer-readable instructions are provided, and the computer-readable instructions, when executed by one or more processors, cause the one or more processors to perform the operations in various method embodiments described above.

In an embodiment, a computer program product or a computer program is provided. The computer program product or the computer program includes computer instructions, and the computer instructions are stored in a computer-readable storage medium. The processor of the computer device reads the computer instructions from the computer-readable storage medium, and the processor executes the computer instructions, to cause the computer device to perform the operations in the foregoing method embodiments.

A person of ordinary skill in the art may understand that all or some of procedures of the method in the foregoing embodiments may be implemented by a computer program by instructing relevant hardware. The program may be stored in a non-transitory computer-readable storage medium. When the program is executed, the procedures of the foregoing method embodiments may be implemented.

Any reference to a memory, a storage, a database, or another medium used in the embodiments provided in this application may include at least one of a non-transitory memory or a volatile memory. The non-transitory memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static random access memory (SRAM) or a dynamic random access memory (DRAM). In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A method for controlling a virtual character performed by a computer device, the method comprising:
   displaying at least a portion of a target virtual character in a virtual scene, the target virtual character being bound with basic bones and deformed bones, wherein the deformed bones are distinct from the basic bones and colocated with the basic bones;
   triggering a character action of the target virtual character in the virtual scene;
   when the character action comprises a character movement, controlling the target virtual character to implement the character movement in the virtual scene through a movement of a basic bone associated with the character movement; and
   when the character action comprises a local character deformation in a field of view of the virtual scene, controlling the target virtual character to implement the local character deformation in the virtual scene through a deformation of a deformed bone associated with the local character deformation.

2. The method according to claim 1, wherein the movement of the basic bone comprises at least one of a bone movement or a bone rotation; and the deformation of the deformed bone comprises at least one of a local bone lengthening or shortening or an overall bone scaling.

3. The method according to claim 1, wherein the target virtual character is generated through a character construction operation, and the character construction operation comprises:
   creating a basic skeleton of the target virtual character, the basic skeleton comprising more than one basic bone;
   adding at least one deformed bone to the basic skeleton; and
   skinning the basic skeleton to which the deformed bone is added, to obtain the target virtual character.

4. The method according to claim 3, further comprising:
   importing the skinned target virtual character as a model into a three-dimensional engine;
   generating the model as a prefabricated part through the three-dimensional engine;
   importing an animation configuration file of the prefabricated part into the three-dimensional engine; and
   calling, through the three-dimensional engine, the prefabricated part to generate the target virtual character in the virtual scene, and controlling, through an action parameter value of the animation configuration file, the target virtual character to perform the character action.

5. The method according to claim 3, wherein the adding at least one deformed bone to the basic skeleton comprises:
   determining a target basic bone in the basic skeleton;
   determining a quantity of deformed bones according to a length of the target basic bone; and
   adding the quantity of sequentially connected deformed bones at a position of the target basic bone on the basic skeleton.

6. The method according to claim 1, further comprising:
   displaying a thumbnail object of the target virtual character on a character movement map;
   controlling the thumbnail object to move within a movement range of the thumbnail object; and
   switching from the character movement map to a character interaction virtual scene when a movement of the thumbnail object satisfies a character interaction trigger condition.

7. The method according to claim 1, further comprising:
   loading a prefabricated part in the virtual scene through a three-dimensional engine, the prefabricated part being obtained by constructing the deformed bones on a basic skeleton of the target virtual character and then performing skinning; and
   creating an instance through the prefabricated part to obtain the target virtual character.

8. The method according to claim 1, wherein the virtual scene is an animation editing scene, and the method further comprises:
   when the target virtual character performs the character action, recording a plurality of key frames in which the target virtual character performs the character action in the virtual scene; and
   generating a video animation based on the plurality of key frames.

9. The method according to claim 8, further comprising:
   displaying a thumbnail object of the target virtual character on a character movement map;
   controlling the thumbnail object to move within a movement range of the thumbnail object;
   switching from the character movement map to a character interaction scene when a movement of the thumbnail object satisfies a character interaction trigger condition; and
   playing the video animation when the character action of the target virtual character is triggered in the character interaction scene.

10. A computer device, comprising a memory and one or more processors, the memory storing computer-readable instructions, the computer-readable instructions, when executed by the one or more processors, causing the one or more processors to perform a method for controlling a virtual character including:
   displaying at least a portion of a target virtual character in a virtual scene, the target virtual character being bound with basic bones and deformed bones, wherein the deformed bones are distinct from the basic bones and colocated with the basic bones;
   triggering a character action of the target virtual character in the virtual scene;
   when the character action comprises a character movement, controlling the target virtual character to implement the character movement in the virtual scene through a movement of a basic bone associated with the character movement; and when the character action comprises a local character deformation in a field of view of the virtual scene, controlling the target virtual character to implement the local character deformation in the virtual scene through a deformation of a deformed bone associated with the local character deformation.

11. The computer device according to claim 10, wherein the movement of the basic bone comprises at least one of a bone movement or a bone rotation; and the deformation of the deformed bone comprises at least one of a local bone lengthening or shortening or an overall bone scaling.

12. The computer device according to claim 10, wherein the target virtual character is generated through a character construction operation, and the character construction operation comprises:

creating a basic skeleton of the target virtual character, the basic skeleton comprising more than one basic bone;
adding at least one deformed bone to the basic skeleton; and
skinning the basic skeleton to which the deformed bone is added, to obtain the target virtual character.

13. The computer device according to claim 12, wherein the method further comprises:

importing the skinned target virtual character as a model into a three-dimensional engine;
generating the model as a prefabricated part through the three-dimensional engine;
importing an animation configuration file of the prefabricated part into the three-dimensional engine; and
calling, through the three-dimensional engine, the prefabricated part to generate the target virtual character in the virtual scene, and controlling, through an action parameter value of the animation configuration file, the target virtual character to perform the character action.

14. The computer device according to claim 12, wherein the adding at least one deformed bone to the basic skeleton comprises:

determining a target basic bone in the basic skeleton;
determining a quantity of deformed bones according to a length of the target basic bone; and
adding the quantity of sequentially connected deformed bones at a position of the target basic bone on the basic skeleton.

15. The computer device according to claim 10, wherein the method further comprises:

displaying a thumbnail object of the target virtual character on a character movement map;
controlling the thumbnail object to move within a movement range of the thumbnail object; and
switching from the character movement map to a character interaction virtual scene when a movement of the thumbnail object satisfies a character interaction trigger condition.

16. The computer device according to claim 10, wherein the method further comprises:

loading a prefabricated part in the virtual scene through a three-dimensional engine, the prefabricated part being obtained by constructing the deformed bones on a basic skeleton of the target virtual character and then performing skinning; and
creating an instance through the prefabricated part to obtain the target virtual character.

17. The computer device according to claim 10, wherein the virtual scene is an animation editing scene, and the method further comprises:

when the target virtual character performs the character action, recording a plurality of key frames in which the target virtual character performs the character action in the virtual scene; and
generating a video animation based on the plurality of key frames.

18. The computer device according to claim 17, wherein the method further comprises:

displaying a thumbnail object of the target virtual character on a character movement map;
controlling the thumbnail object to move within a movement range of the thumbnail object;
switching from the character movement map to a character interaction scene when a movement of the thumbnail object satisfies a character interaction trigger condition; and
playing the video animation when the character action of the target virtual character is triggered in the character interaction scene.

19. One or more non-transitory computer-readable storage media storing computer-readable instructions, the computer-readable instructions, when executed by one or more processors, causing the one or more processors to perform a method for controlling a virtual character including:

displaying at least a portion of a target virtual character in a virtual scene, the target virtual character being bound with basic bones and deformed bones, wherein the deformed bones are distinct from the basic bones and colocated with the basic bones;
triggering a character action of the target virtual character in the virtual scene;
when the character action comprises a character movement, controlling the target virtual character to implement the character movement in the virtual scene through a movement of a basic bone associated with the character movement; and
when the character action comprises a local character deformation in a field of view of the virtual scene, controlling the target virtual character to implement the local character deformation in the virtual scene through a deformation of a deformed bone associated with the local character deformation.

20. The non-transitory computer-readable storage media according to claim 19, wherein the virtual scene is an animation editing scene, and the method further comprises:

when the target virtual character performs the character action, recording a plurality of key frames in which the target virtual character performs the character action in the virtual scene; and
generating a video animation based on the plurality of key frames.

* * * * *